(12) United States Patent
Gur et al.

(10) Patent No.: US 12,340,293 B2
(45) Date of Patent: Jun. 24, 2025

(54) MACHINE LEARNING MODEL REPOSITORY MANAGEMENT AND SEARCH ENGINE

(71) Applicant: International Business Machines Corporation, Armonk, NY (US)

(72) Inventors: Yaniv Gur, San Jose, CA (US); Tanveer F. Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1740 days.

(21) Appl. No.: 16/515,166

(22) Filed: Jul. 18, 2019

(65) Prior Publication Data

US 2021/0019665 A1   Jan. 21, 2021

(51) Int. Cl.
| | | |
|---|---|---|
| G06N 20/20 | (2019.01) | |
| G06F 8/36 | (2018.01) | |
| G06F 8/71 | (2018.01) | |
| G06N 5/01 | (2023.01) | |
| G06N 7/01 | (2023.01) | |
| G06N 20/00 | (2019.01) | |

(52) U.S. Cl.
CPC ............. *G06N 20/20* (2019.01); *G06F 8/36* (2013.01)

(58) Field of Classification Search
CPC .......... G06N 20/00; G06N 20/20; G06N 7/01; G06N 5/01; G06F 8/36; G06F 8/71
See application file for complete search history.

(56) References Cited

U.S. PATENT DOCUMENTS

| | | |
|---|---|---|
| 9,984,772 B2 | 5/2018 | Liu et al. |
| 9,990,187 B1 | 6/2018 | Carroll et al. |
| 10,163,028 B2 | 12/2018 | Rubens et al. |
| 10,386,827 B2 | 8/2019 | Enver et al. |
| 10,417,528 B2 | 9/2019 | Ma et al. |
| 10,581,866 B1* | 3/2020 | Edwards ............. H04L 63/0876 |
| 2016/0217387 A1* | 7/2016 | Okanohara ............ G06N 20/00 |
| 2017/0052652 A1 | 2/2017 | Denton et al. |
| 2017/0102678 A1 | 4/2017 | Nixon et al. |
| 2017/0111331 A1 | 4/2017 | Auradkar et al. |
| 2018/0349814 A1 | 12/2018 | Dhingra et al. |
| 2019/0005089 A1* | 1/2019 | Kempf ................ G06F 16/2425 |
| 2019/0043127 A1* | 2/2019 | Mahapatra ............. G06Q 40/03 |
| 2019/0087746 A1* | 3/2019 | Jain ........................ G06N 5/022 |

(Continued)

*Primary Examiner* — Noor Alkhateeb
(74) *Attorney, Agent, or Firm* — Stephen J. Walder, Jr.; Gavin Giraud

(57) ABSTRACT

Mechanisms are provided to implement a machine learning framework that operates to register a plurality of machine learning algorithms used to train machine learning models to perform related tasks, and to index the machine learning algorithms to generate and store a machine learning algorithm metadata model for each machine learning algorithm. The machine learning framework receives a user specification of an analytics pipeline task for which a machine learning model is to be trained, and converts the user specification to machine learning algorithm search criteria used to search the index to identify matching machine learning algorithms having a corresponding machine learning algorithm metadata model that matches the machine learning algorithm search criteria. The machine learning framework outputs information describing the matching machine learning algorithms.

17 Claims, 4 Drawing Sheets

(56) References Cited

U.S. PATENT DOCUMENTS

| | | |
|---|---|---|
| 2019/0114168 A1 | 4/2019 | Lee et al. |
| 2019/0171425 A1 | 6/2019 | Dempsey |
| 2019/0197418 A1 | 6/2019 | Abutbul et al. |
| 2019/0197419 A1 | 6/2019 | Abutbul et al. |
| 2019/0325094 A1* | 10/2019 | Beall, III ................ G06N 20/00 |
| 2020/0012962 A1* | 1/2020 | Dent ...................... G06N 20/20 |

* cited by examiner

MACHINE LEARNING MODEL REPOSITORY MANAGEMENT AND SEARCH ENGINE

BACKGROUND

The present application relates generally to an improved data processing apparatus and method and more specifically to computer mechanisms for providing a machine learning model repository and for managing the machine learning models in the machine learning model repository as well as providing a search engine capability.

Machine learning (ML) is a type of computer based artificial intelligence utilizing algorithms and statistical models to effectively perform a specific task without using explicit instructions but instead relying on the learning of patterns and inference instead. Machine learning algorithms build a computer model having operational properties learned based on a processing of sampled data, known as "training data", in order to make predictions or decisions without being explicitly programmed to perform the task. Machine learning algorithms are used in a wide variety of applications, such as email filtering, and computer vision, where it is infeasible to develop an algorithm of specific instructions for performing the task.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions executed by the at least one processor to cause the at least one processor to implement a machine learning framework. The machine learning framework operates to register, in a machine learning algorithm repository, a plurality of machine learning algorithms, wherein each machine learning algorithm is an algorithm used to train a machine learning model to perform a related task. The machine learning framework further operates to index, by the machine learning framework, the plurality of machine learning algorithms to generate and store in a machine learning algorithm index data storage, a machine learning algorithm metadata model for each machine learning algorithm in the plurality of machine learning algorithms. In addition, the machine learning framework further operates to receive, via a user interface of the machine learning framework, a user specification of at least one analytics pipeline task for which at least one machine learning model is to be trained, and convert, by a machine learning algorithm search criteria generation engine of the machine learning framework, the user specification to one or more machine learning algorithm search criteria. Moreover, the machine learning framework operates to search, by a machine learning algorithm search engine of the machine learning framework, the machine learning algorithm index data storage, based on the one or more machine learning algorithm search criteria, to identify at least one matching machine learning algorithm having a corresponding machine learning algorithm metadata model that matches the one or more machine learning algorithm search criteria. Additionally, the machine learning framework operates to output, via the user interface, information describing the at least one matching machine learning algorithm.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
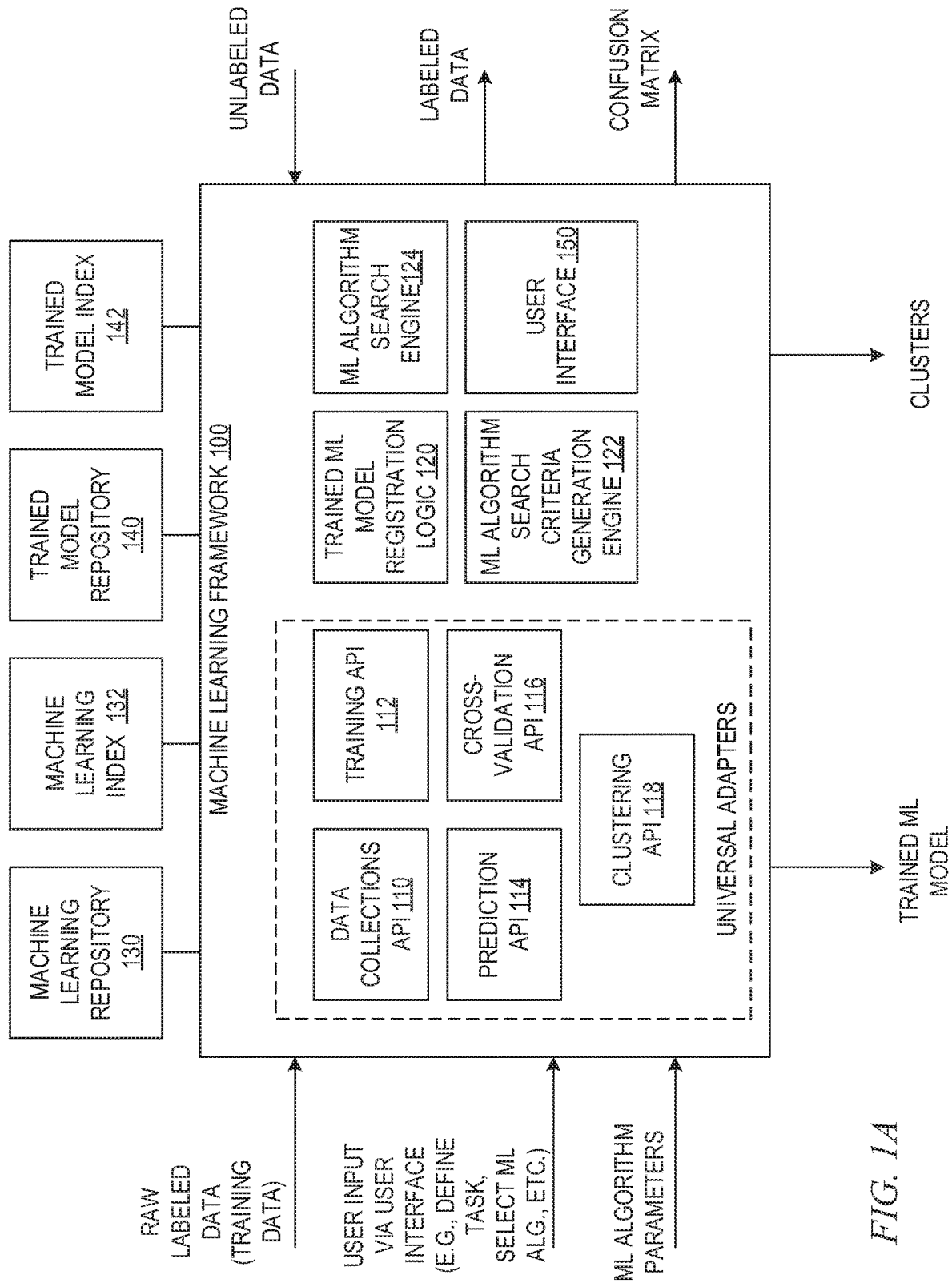
FIG. 1A is an example diagram of a machine learning framework in accordance with one illustrative embodiment.

With the advent of artificial intelligence (AI), such as computer based machine learning systems, opportunities arise for the use of intelligent computing devices and machines in assisting human beings in performing operations without requiring human input. These AI tools may employ neural networks, cognitive computing systems, or other AI mechanisms that are trained based on a finite set of data to perform specific tasks. In general, these AI tools employ machine learning computer models (or simply ML models) to perform tasks that emulate human thought processes by learning patterns and relationships between data that are representative of particular results, e.g., image classifications or labels, data values, medical treatment recommendations, etc. The ML model is essentially a function of elements including the machine learning algorithm(s), configuration settings of the machine learning algorithm(s), data samples (or training data), features identified by the ML model, and the labels (or outputs) generated by the ML model. By specifically tuning the function of these elements through a machine learning process, a specific ML model instance is generated.

As AI tools become more prevalent, and more work is put into generating AI mechanisms employing ML models, the number of ML algorithms that have been developed is voluminous. It should be appreciated that there is a difference between the ML models and the ML algorithms which are used to train these ML models. A ML algorithm is the algorithm used to train a ML model whereas the ML model is the computer logic that captures the results of training on collections of data and persists the training for use on newly received data. An example of a ML model includes a trained neural network, e.g., convolutional neural network, that is trained using a ML algorithm to modify the ML model's operational parameters to thereby capture the training and persist the training for application to new data.

The ML pipeline may include any of a number of different types of ML algorithms. Examples of ML algorithms may include deep learning, perceptual clustering, scale-space time series order-preserving clustering, kernel density shape-based classification, modified shape context-based spatial pyramid kernels, predictive space-aggregated regression (PSAR), multiple kernel completion (MKC) learning, multi-layer random forests, structured output DNN, sequential path learning, multi-layer future fusion random forests, ambiguous random forests, conditional random fields semantic predictors, nuclear-norm-constrained MKL, scandent trees, multi-atlas learning-based fusion, multi-atlas affine kernel-based learning, etc. Operations in training a ML model using such ML algorithms include the training operations themselves, prediction/classification operations, cross-validation operations, and clustering operations, which will be described in greater detail hereafter.

An analytics pipeline is a computer based processing pipeline comprising one or more stages of processing logic, e.g., pre-processing, analytics processing, and output processing, where one or more of the stages may use one or more trained ML models that operate on data that flows through the pipeline. Analytics and analytics pipeline are used herein interchangeably. The present invention provides a mechanism for maintaining a repository of ML algorithms and for searching and retrieving ML algorithms for training ML models that are to be used as part of ML analytics pipelines to perform operations of an analytics task.

The "collections" of data upon which a ML model operates or upon which it is trained using a ML algorithm, are logical organizations of data, e.g., images, regions, pixels, atlases, text documents, exam questions, etc. Collections of data may have associated metadata specifying various characteristics of the collections, including labels associated with the content of the collection of data, where the labels describe the content of the collection of data in some way, e.g., the metadata may specify a type of medical image, the type of technology utilized to generate the medical image, whether or not the medical image contains an anomaly, a source of the medical image, the domain and/or modality of the medical image, etc.

There currently is no model management mechanism available for assisting with managing the large number of ML algorithms, their datasets, their labels, model architecture and the model versions that have been developed or that are under development. To the contrary, management of ML algorithms is largely an individual independent manual effort of each human developer to know and understand what ML algorithms are available and the specific details of each of these ML algorithms with regard to what they may be used for. Many times, human developers may make their own versions of third party available ML algorithms, or may generate new ML algorithms that may not be readily known to other human developers. In large scale organizations, and even across organizations, this means that many times redundant efforts are being performed, or work done by one developer may be helpful to other developers if they were aware of the work being done. Thus, the reusability of ML algorithms and training data used in training ML models becomes more attractive as the volume of ML algorithms increases. That is, it would be desirable to have a mechanism for managing ML algorithms and providing a search engine capability for finding ML algorithms that provide functionality needed for performing a desired training of a ML model to perform a desired task. Moreover, it would be beneficial to have an automated tool for integrating a previously defined ML algorithm into a new implementation of a ML model for addressing a task without requiring manual configuring of the ML algorithm for the new task or ML model.

The illustrative embodiments provide a ML framework comprising one or more universal ML application programming interfaces (APIs) and one or more databases of ML algorithms. The ML framework of the illustrative embodiments abstract the details of the ML algorithms through the one or more universal ML APIs and provides an engine to automatically handle all connectivity and format details of ML algorithms so that individual algorithm developers become users through the one or more ML APIs. The ML framework of the illustrative embodiments enables analytics developers to experiment with different ML algorithms and keep track of results obtained through such experimentation so as to understand as to which ML algorithms best suited for the particular task at hand.

The set of universal ML APIs enables common machine learning tasks, e.g., training, testing, prediction, and exposes standard ways to input features for ML algorithms. APIs are provided to support connection and data formatting to the ML algorithms. The framework utilizes an object-relational model to persist information about ML algorithms in a ML algorithm metadata model represented in a relational database turned into an index that represents these instances of the ML algorithm metadata model. The ML algorithm metadata model itself includes a description of the aggregate collections, a description of features generated from collections, a description of the machine learning model, provenance information about the ML algorithm. The ML algorithms themselves are stored in a file repository. Connection interfaces are provided for allowing the analytics runtime engines to run the various ML algorithms on different architectures, e.g., Apache SPARK, UIMA, etc.

As an example of the problems addressed by the illustrative embodiments, a medical computing system may perform many different tasks for which ML models are utilized. These ML models must be trained using ML algorithms for the particular tasks that they are to be implemented to perform. The ML algorithms are, on their own, also referred to as analytics, but may also be part of a wider analytic that is composed of various pre- and post-processing algorithms. An ML model is the output of the ML training algorithm. In general, machine learning algorithm development, for purposes of clarification, comprises a training stage and an inference stage. In the training stage, data and labels are given to the ML algorithm to produce an ML model. In the inference stage, the ML model and unlabeled data are taken by the inference algorithm to produce a label for the data as output.

The ML models and the ML algorithms used to train these ML models may comprise many different variants of third party ML models/algorithms, many in-house implementations of third party ML models/algorithms, and many novel ML models/algorithms designed with their own configurations. Moreover, the data sets being analyzed may vary from images to text to natural language questions, etc. For example, in a medical computing system, some ML models/algorithms may be used to analyze medical images to classify anomalous images, some ML models/algorithms may be used to analyze the text of patient medical records to extract information indicative of medical conditions, drugs being taken by a patient, medical procedures/treatments performed, etc. Moreover, other ML models/algorithms may be used to ingest and extract information from medical documentation in a corpus of information, such as medical journals, publications, patient support group websites, etc. Thus, because of the voluminous nature of the ML models and ML algorithms present, and the lack of any known mechanism to manage and curate such ML algorithms for reuse by different developers, it would be beneficial to have a mechanism that promotes and makes available ML algorithms in a manner that assists developers in generating trained ML models for their analytics pipelines.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network API card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, FIG. 1A is a block diagram illustrating an example of the machine learning framework in accordance with one illustrative embodiment. As shown in FIG. 1A, the framework 100 includes a data collections application programming interface (API) 110, a training API 112, prediction API 114, cross-validation (testing) API 116, clustering API 118, trained ML model registration logic 120, a ML algorithm search criteria generation engine 122, and a ML algorithm search engine 124. The framework 100 maintains a machine learning (ML) repository 130 and ML index 132. The ML repository 130 stores ML algorithms, used to train ML models, which are indexed in the ML index 132. The stored ML algorithms are stored for selection by developers (users) when a new trained machine learning model is needed to perform a task, such as a task that is part of an analytics pipeline. The ML index 132 provides indexes of the stored ML algorithms in the ML repository 130 such that the indexes may be searched based on developer (user) specified criteria for the task to be performed, and corresponding matching ML algorithms may be retrieved and utilized to train a ML model to perform the task. The trained ML model may then be registered, by the trained ML model registration logic 120, in a ML model repository 140, indexed by a ML model index 142, for use in analytics pipelines to perform corresponding tasks.

The framework 100 may provide a user interface through which the framework 100 obtains a user specification of a task for which a ML model is to be trained. The user's specified task is translated by the ML algorithm search criteria generation engine of the ML framework 100 to a set of training criteria for training a ML model where these training criteria are used as search criteria by the ML algorithm search engine 124 for use in searching the ML index 132. The criteria are used as search terms for matching against ML algorithm metadata models stored in the ML index 132 and which represent registered ML algorithms. The ML algorithm search engine 124 performs a search of the ML index 132 based on these search terms in order to find one or more corresponding ML algorithms that have metadata descriptions matching the search criteria. The matching ML algorithms represent ML algorithms that may be used to train an ML model for the specified task. For example, consider a developer who wants to build an analytics pipeline for X-ray image classification. This requires the developer to first find the viewpoint captured in the X-ray (AP or PA view), then assess it for technical quality, and then begin to detect the findings. For each of these steps, the developer can query the framework 100 to see if there are any ML models that already exist that can solve the various parts of the problem in developing the analytics pipeline. The search criteria will reflect the modality (X-ray), the viewpoints (AP, PA), the technical quality and target findings the developer is interested in when building the analytics pipeline. The ML algorithm search engine 124 returns a list of suitable ML models generated by several developers for one or more of the tasks in the proposed analytics pipeline as search results. The developer can then discover their APIs in the framework 100 and compose the analytics pipeline to achieve the task at hand. For instances where ML models do not already exist for the particular task, ML algorithms that may be used to train a new ML model to perform the corresponding task may be identified via a search of the ML algorithm index, with subsequent retrieval and utilization of the ML algorithm to train a new ML model to perform the required task.

Thus, a user may specify a task to be performed through a user interface 150 of the framework 100, which may provide portions of the user interface where the user may specify the functions to be performed, e.g., medical image analysis, patient medical record textual analysis, etc., the type of data upon which the task is to be performed, e.g., particular type of medical image to be processed, type of text to be processed, the type of output desired, e.g., output labels for classifications of the medical image, output labels for classifying the patient medical information extracted from the medical records of the patient, etc. These task characteristics are converted to corresponding search criteria for searching the model index 142 to determine if there are existing trained ML models registered in the trained model repository 140 that satisfy the search criteria of the task, such as by performing natural language processing of the task characteristics to extract keywords indicative of search criteria, using mapping data structures to map task characteristics to search criteria, using the task characteristics themselves as search criteria, or the like. A task may comprise multiple different functions that need to be performed where each function may have its own corresponding search criteria obtained from the definition of the task and thus, will have its own set of trained ML models which may be found to perform that function of the overall task.

If there is not an existing ML model that handles the required task identified via the search of the trained model index 142, then a search of ML algorithms which may be used to train a ML model may be performed using the ML index 132 and corresponding repository of ML algorithms 130. That is, a similar search of the ML index 132 is performed based on the search criteria to identify ML algorithms whose resulting ML model will perform the desired task. An identification of these matching ML algorithms may then be returned to the user via a user interface 150 for selection and execution of the ML algorithms to train a ML model to perform the desired task, which may then be registered and indexed in the trained model repository 140 and trained model index 142.

It should be appreciated that ML models are registered in the trained model repository 140 and the ML algorithms are registered in the ML repository 130 which, in one illustrative embodiment, are relational databases with corresponding indices 132 and 142, which in some illustrative embodiments are Lucene indices. The ML index 132 represents an ML algorithm registered in the ML repository 130 as a ML metadata model comprising a description of the aggregate collections upon which the ML model trained by the ML algorithm operates, a description of features generated from collections by the ML model trained by the ML algorithm, a description of the ML model that is trained by the ML algorithm, and provenance information about the ML algorithm. A similar metadata structure is generated for trained ML models themselves in the trained model index 142 for trained ML models stored in the trained model repository 140. For example, the ML metadata model may store information such as the location of the ML model file in storage, the imaging modality and specialty the ML model serves, the ML algorithm used to train the ML model, various parameters or settings associated with the ML model, an identification of the training data collection used to train the ML model, the types of labels produced by the ML model, as well as provenance information that includes information on the person(s) that created the ML model and the features that person used to train the ML model. In short, all the relevant information descriptive of how the ML model was created is in the ML metadata model which is indexed in the database. This allows tracking numerous ML models and ML algorithms and using them for deployment of ML models in analytics pipelines and/or training of ML models for deployment in analytics pipelines.

In one illustrative embodiment, the conversion of the task specification input by the user (human developer) converts the task specification to corresponding types of information as is used to define the ML algorithm metadata model, e.g., converting task characteristics specified by the user to corresponding ones of search criteria specifying data collections for which the task is to be performed, search criteria of the features to be generated as output by the trained ML model from the data collections, a description of the type of ML model that is to be used, and provenance information about the ML algorithm that the user wishes to utilize.

As mentioned above, the ML algorithm search engine 124 searches the ML index 132 based on the search criteria obtained from the task characteristics generated by the analytics pipeline creation engine 122. The search, in one illustrative embodiment in which a Lucene index is utilized, involves performing a text based search of terms in the ML algorithm metadata models based on terms in the search criteria to find ML algorithm metadata models matching the search criteria. It should be appreciated that while a Lucene index is used in the described examples, the present invention is not limited to such and any index or search engine mechanisms may be used without departing from the spirit and scope of the present invention, e.g., Solr, Elastic Search, or other types of indices and search engines.

ML algorithm metadata models found as matching the search criteria based on the task characteristics, using the ML index 132, may be presented to the user as recommendations for use in training ML models for use in performing the specified task, or a corresponding portion of the task. In some illustrative embodiments, these found ML algorithms may be presented to the user in a ranked listing based on a degree of matching of the ML algorithm's metadata with the search criteria. In some cases, threshold values may be established for determining a threshold degree of matching between ML algorithm metadata model and search criteria in order to determine that there is a match. In some illustrative embodiments, a highest ranking matching ML algorithm may be automatically selected for training a ML model to perform the specified task, or a corresponding portion of the task. A user selection of a ML algorithm to use to train a ML model to perform a specified task may be received via the user interface 150 to initiate a training operation to utilize the selected ML algorithm for training a corresponding ML model, after which the ML model may be registered in the trained model repository 140 and indexed in the trained model index 142, as well as deployed as part of an analytics pipeline.

The ML framework 100 may utilize the universal APIs 110-118 to train a ML model using a selected ML algorithm that is selected using the mechanism described above. In some illustrative embodiments, the selection itself may be made by a human developer via the user interface 150 after being presented with the recommendations for the ML algorithms based on the results of the search. In other illustrative embodiments, the selection may be performed automatically by the ML framework 100, such as by selecting a highest ranking ML algorithm that matches the search criteria to a predetermined threshold level of matching. The selected ML algorithm is then used The ML algorithm APIs 110-118 provide a standardized or universal mechanism for inputting data collections, features, and the like, for the ML algorithms. For example, the data collections API 110 provides computer logic for forming logical collections of data samples and associating features with data samples and collections, where the "features" are feature vectors used to train the ML model. The data collections API 110 further provides computer logic for associating output labels of a trained ML model with the data collections and persisting the logical data collections in the ML index 132.

The training API 112 provides computer logic for producing trained ML models using the selected ML algorithm(s) to train the ML model. The training API 112 further provides computer logic for describing the trained ML models and associating them with data collections used for training the ML models. Moreover, the training API 112 also provides computer logic for persisting the trained ML models in the trained model repository 140 and indexing the trained ML model in the trained model index 142.

The prediction API 114 provides computer logic for classifying new data instances based on a previously trained ML model and allows searching of prior trained ML models based on various attributes. The cross-validation (testing) API 116 provides computer logic for enabling selection of datasets for testing a trained ML model, supporting n-fold cross validation, computing the confusion matrix, and enabling persistence of the trained ML model and performance models, where "persistence" as the term is used herein means storing the ML model and indexing its metadata. The clustering API 118 provides computer logic for performing a ML technique that takes a group of feature vectors and the number of clusters and groups the feature vectors into clusters based on a vector similarity measure.

In response to a user requesting a ML model to be trained for a specified task, the ML algorithm search criteria generation engine 122 translates the user input specifying the task definition, as received via the user interface 150, into search criteria that are used by the ML algorithm search engine 124 to search the ML index 132 to find one or more matching ML algorithms that are able to be used to train an ML model to perform the task, or a portion of the task. The ML algorithm information for the matching ML algorithms may be output to the user via the user interface 150 as ML algorithm recommendations, and the user may select an ML algorithm to utilize as well as provide the ML algorithm parameters for configuring the ML algorithm to train the ML model to the user's specifications. Alternatively, as noted above, the ML framework 100 may select the ML algorithm automatically, such as by selecting a highest ranking matching ML algorithm for use in training the ML model and utilizing a default set of ML algorithm parameters.

Based on the user's selection, or automated selection, of the ML algorithm, the universal APIs 110-118 are utilized along with the selected ML algorithm to train an ML model, test (cross-validate) the trained model, and provide performance information regarding the training/testing of the ML model. For example, once trained using the raw labeled data (training data), unlabeled data may be input to the trained ML model to generate labeled data and a corresponding confusion matrix which describes the performance of the trained ML model. This information may be used to present the results and performance information for the trained ML model to a user via the user interface 150. The trained ML model may be output for storage by the trained ML model registration logic 120 in the trained model repository 140 and indexed in the trained model index 142 for later use in analytics pipelines.

Figure 1B:
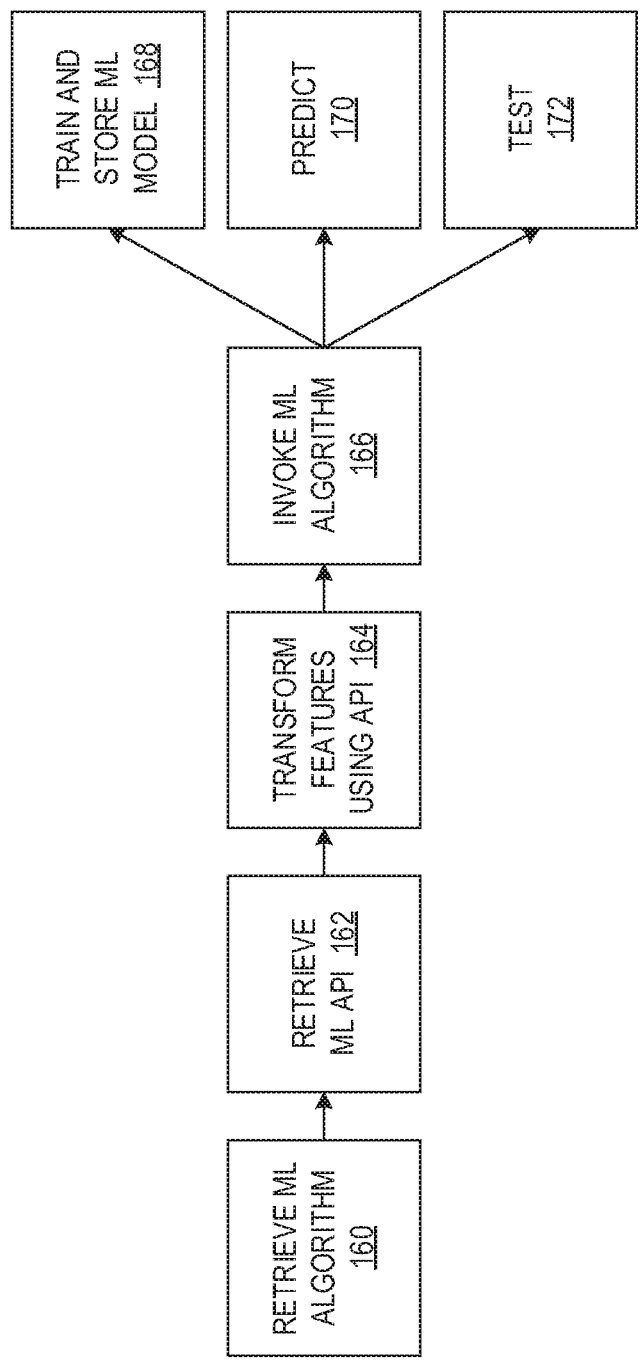
FIG. 1B is an example diagram illustrating an execution of a machine learning algorithm in the machine learning framework in accordance with one illustrative embodiment.

FIG. 1B is an example diagram illustrating an execution of a machine learning algorithm in the machine learning framework in accordance with one illustrative embodiment. The operation shown in FIG. 1B outlines the operation of the ML framework 100 after the selection of a ML algorithm is obtained via the ML framework 100. As shown in FIG. 1B, the selected ML algorithm is retrieved from the ML repository 130 (step 160), the ML APIs for the selected ML algorithm are retrieved (step 162).

The operation then transforms features using the ML APIs for the selected ML algorithm (step 164). The selected ML algorithm is then invoked (step 166) to train the ML model which is then stored in the trained model repository (step 168). In addition, the framework 100 utilizes the prediction and cross-validation (testing) APIs 114 and 116 to evaluate the training of the ML model (steps 170 and 172).

Figure 2:
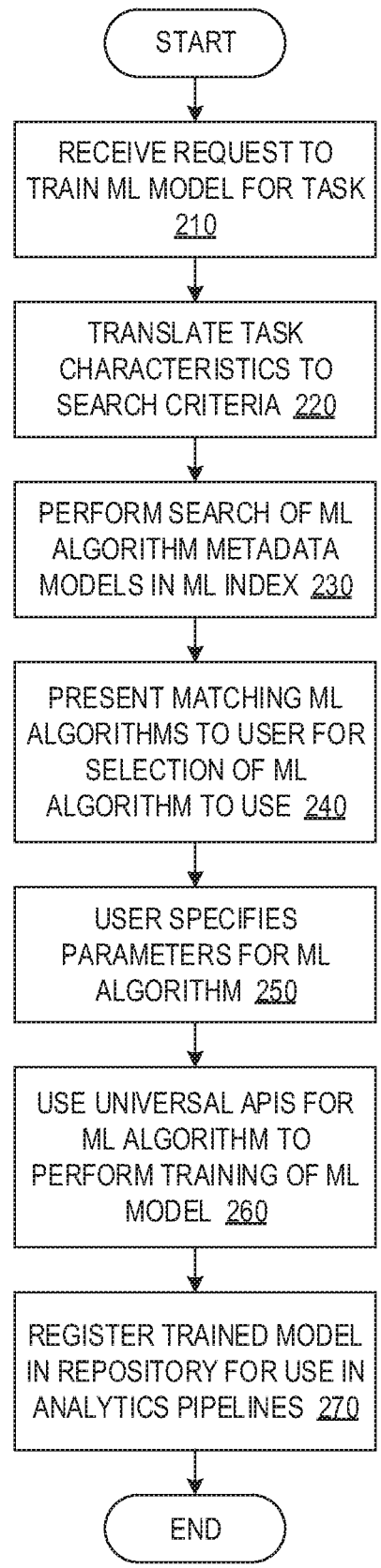
FIG. 2 is a flowchart outlining an example operation of a machine learning framework in accordance with one illustrative embodiment.

FIG. 2 is a flowchart outlining an example operation of a machine learning framework in accordance with one illustrative embodiment. As shown in FIG. 2, the operation starts by receiving a request to configure a machine learning model, such as a neural network or the like, to perform a task, such as a task that may be implemented as part of an analytics pipeline (step 210). As discussed above, the definition of the task may further specify the data upon which the task is to be performed or trained. The task characteristics are translated to search criteria (step 220) and a search of machine learning algorithm metadata models stored in a machine learning index is performed based on the search criteria (step 230). The search results are obtained and presented to a user that submitted the request for selection of a machine learning algorithm for use in training a machine learning model to perform the task (step 240). The user may specify parameters for the machine learning algorithm (step 250).

The universal APIs of the machine learning framework are then utilized to perform the training and testing of the trained machine learning model (step 260). As noted above, a data collections API is used to generate data collections from the training data, the training API is used to perform the training of the machine learning model given the data collections, the selected machine learning algorithm and its parameters, and the training data (raw labeled data). The cross-validation (testing) API and prediction API are used to evaluate the training of the trained machine learning model and present performance information to the user via the user interface. The trained model is registered with a trained model repository and corresponding trained model index for use in analytics pipelines (step 270).

Figure 3:
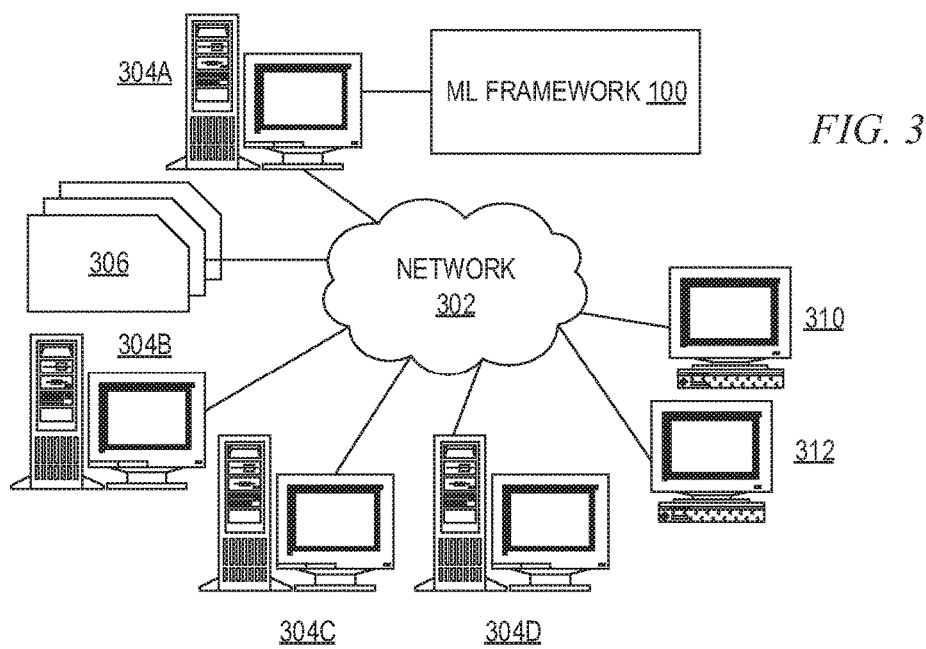
FIG. 3 is an example schematic diagram of a distributed data processing system in which aspects of the illustrative embodiments may be implemented.
Figure 4:
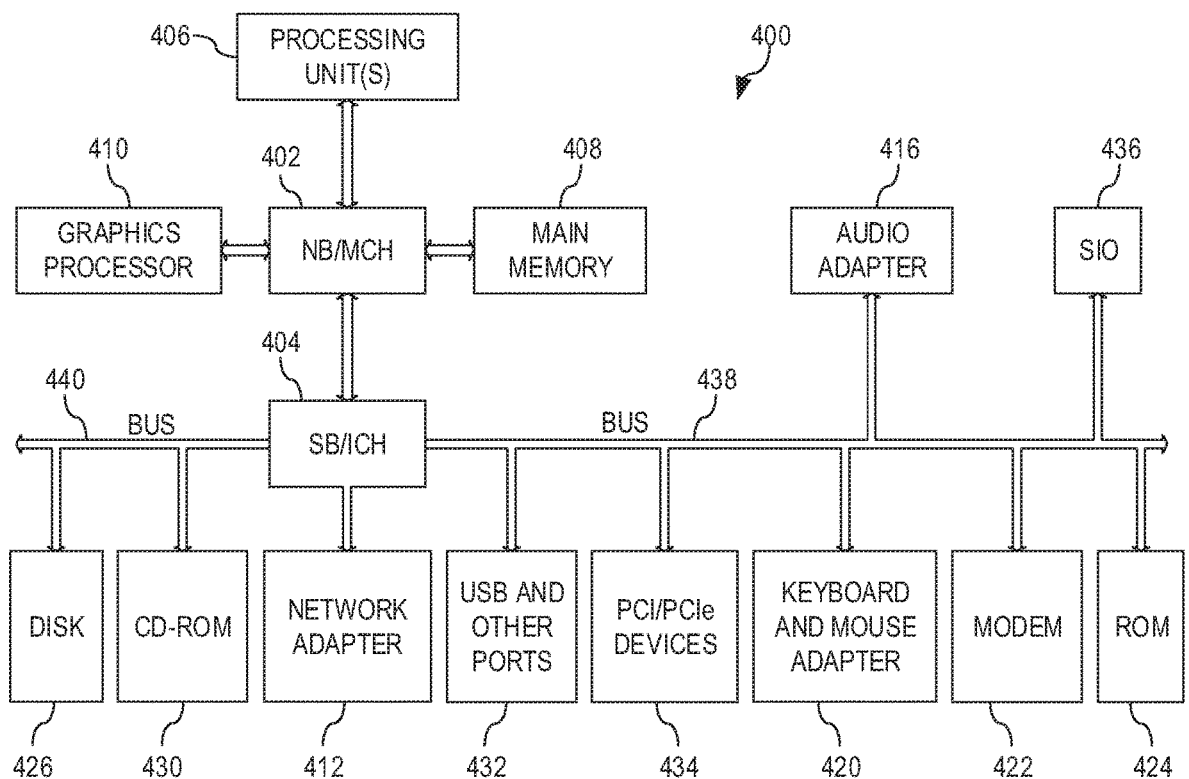
FIG. 4 is a block diagram of an example data processing system in which aspects of the illustrative embodiments are implemented.

The illustrative embodiments may be utilized in many different types of data processing environments. In order to provide a context for the description of the specific elements and functionality of the illustrative embodiments, FIGS. 3-4 are provided hereafter as example environments in which aspects of the illustrative embodiments may be implemented. It should be appreciated that FIGS. 3-4 are only examples and are not intended to assert or imply any limitation with regard to the environments in which aspects or embodiments of the present invention may be implemented. Many modifications to the depicted environments may be made without departing from the spirit and scope of the present invention.

FIG. 3 depicts a schematic diagram of one illustrative embodiment of a distributed data processing system in which a machine learning framework 100 is implemented. As shown in FIG. 3, the machine learning framework 100 is implemented on one or more computing devices 304A-D (comprising one or more processors and one or more memories, and potentially any other computing device elements generally known in the art including buses, storage devices, communication interfaces, and the like) connected to the computer network 302. For purposes of illustration only, FIG. 3 depicts the machine learning framework 100 being implemented on computing device 304A only, but as noted above the cognitive system 300 may be distributed across multiple computing devices, such as a plurality of computing devices 304A-D. The network 302 includes multiple computing devices 304A-D, which may operate as server computing devices, and 310-112 which may operate as client computing devices, in communication with each other and with other devices or components via one or more wired and/or wireless data communication links, where each communication link comprises one or more of wires, routers, switches, transmitters, receivers, or the like.

The machine learning framework 100 receives input from the network 302, a corpus or corpora of electronic documents 306, machine learning framework users, and/or other data from other possible sources of input. In one embodiment, some or all of the inputs to the machine learning framework 100 are routed through the network 302. The various computing devices 304A-D on the network 302 include access points for content creators and cognitive system users. Some of the computing devices 304A-D include devices for a database storing the corpus or corpora of data 306 (which is shown as a separate entity in FIG. 3 for illustrative purposes only). Portions of the corpus or corpora of data 306 may also be provided on one or more other network attached storage devices, in one or more databases, or other computing devices not explicitly shown in FIG. 3. The network 302 includes local network connections and remote connections in various embodiments, such that the machine learning framework 100 may operate in environments of any size, including local and global, e.g., the Internet.

In one embodiment, machine learning framework users access the machine learning framework 100 via a network connection or an Internet connection to the network 302, and input requests to configure machine learning models for constructing analytics pipelines by specifying a task to be performed. The machine learning framework 100 provides the logic for converting that task specification into search criteria for finding the machine learning algorithms to train machine learning models that can perform the necessary analytics to accomplish the task when formulated into an analytics pipeline. The machine learning framework 100 searches for the machine learning algorithms using the machine learning index and the machine learning algorithm metadata models of the machine learning algorithms, retrieves selected machine learning algorithms from the machine learning repository, and trains machine learning models using the selected machine learning algorithms to generate trained machine learning models that are stored for use in analytics pipelines.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

FIG. 4 is a block diagram of an example data processing system in which aspects of the illustrative embodiments are implemented. Data processing system 400 is an example of a computer, such as server 304A or client 310 in FIG. 3, in which computer usable code or instructions implementing the processes for illustrative embodiments of the present invention are located. In one illustrative embodiment, FIG. 4 represents a server computing device, such as a server 304A, which implements a ML framework 100.

In the depicted example, data processing system 400 employs a hub architecture including North Bridge and Memory Controller Hub (NB/MCH) 402 and South Bridge and Input/Output (I/O) Controller Hub (SB/ICH) 404. Processing unit 406, main memory 408, and graphics processor 410 are connected to NB/MCH 402. Graphics processor 410 is connected to NB/MCH 402 through an accelerated graphics port (AGP).

In the depicted example, local area network (LAN) API 412 connects to SB/ICH 404. Audio API 416, keyboard and mouse API 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet APIs, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 is connected to SB/ICH 404.

An operating system runs on processing unit 406. The operating system coordinates and provides control of various components within the data processing system 400 in FIG. 4. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM® eServer™ System p® computer system, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and are loaded into main memory 408 for execution by processing unit 406. The processes for illustrative embodiments of the present invention are performed by processing unit 406 using computer usable program code, which is located in a memory such as, for example, main memory 408, ROM 424, or in one or more peripheral devices 426 and 430, for example.

A bus system, such as bus 438 or bus 440 as shown in FIG. 4, is comprised of one or more buses. Of course, the bus system may be implemented using any type of communication fabric or architecture that provides for a transfer of data between different components or devices attached to the fabric or architecture. A communication unit, such as modem 422 or network API 412 of FIG. 4, includes one or more devices used to transmit and receive data. A memory may be, for example, main memory 408, ROM 424, or a cache such as found in NB/MCH 402 in FIG. 4.

Those of ordinary skill in the art will appreciate that the hardware depicted in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network APIs may also be coupled to the system to enable the data processing system to become coupled to other data processing systems or remote printers or storage devices through intervening private or public networks. Modems, cable modems and Ethernet cards are just a few of the currently available types of network APIs for wired communications. Wireless communication based network APIs may also be utilized including, but not limited to, 802.11 a/b/g/n wireless communication APIs, Bluetooth wireless APIs, and the like. Any known or later developed network APIs are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement a machine learning framework, wherein the machine learning framework operates to:

register, in a machine learning algorithm repository, a plurality of machine learning algorithms, wherein each machine learning algorithm is an algorithm used to train a machine learning model to perform a related task;

index, by the machine learning framework, the plurality of machine learning algorithms to generate and store, in a machine learning algorithm index data storage, a machine learning algorithm metadata model for each machine learning algorithm in the plurality of machine learning algorithms;

receive, via a user interface of the machine learning framework, a user specification of at least one analytics pipeline task for which at least one machine learning model is to be trained;

convert, by a machine learning algorithm search criteria generation engine of the machine learning framework, the user specification to one or more machine learning algorithm search criteria;

search, by the machine learning framework, a trained machine learning model index data storage indexing a plurality of trained machine learning models to identify zero or more matching trained machine learning models having a corresponding trained machine learning model metadata model that matches the one or more machine learning algorithm search criteria;

output, via the user interface, information describing the zero or more matching trained machine learning model; and in response to the search of the trained machine learning model index data storage resulting in zero matching trained machine learning models being identified:

search, by a machine learning algorithm search engine of the machine learning framework, the machine learning algorithm index data storage, based on the one or more machine learning algorithm search criteria, to identify at least one matching machine learning algorithm having a corresponding machine learning algorithm metadata model that matches the one or more machine learning algorithm search criteria; and output, via the user interface, information describing the at least one matching machine learning algorithm, wherein the machine learning framework further operates to:

receive a user selection of a machine learning algorithm from the at least one matching machine learning algorithm; and train a machine learning model using the selected machine learning algorithm to generate a new trained machine learning model, and wherein training the machine learning model using the selected machine learning algorithm comprises invoking a plurality of universal application programming interfaces (APIs) to perform the training of the machine learning model.

2. The method of claim 1, wherein the machine learning framework is further configured to:

register, in a trained machine learning model repository, the plurality of trained machine learning models; and index, by the machine learning framework, the plurality of trained machine learning models to generate and store in the trained machine learning model index data storage, a trained machine learning model metadata models for each trained machine learning algorithm in the plurality of trained machine learning models.

3. The method of claim 1, wherein the machine learning framework further operates to determine, for each machine learning algorithm in the plurality of machine learning algorithms in the machine learning algorithm repository, a degree of matching of the machine learning algorithm to the one or more machine learning algorithm search criteria, wherein the output of the information describing the at least one matching machine learning algorithm comprises a ranked listing of the at least one matching machine learning algorithm based on the degree of matching for each matching machine learning algorithm in the at least one matching machine learning algorithm.

4. The method of claim 1, wherein the machine learning framework comprises the plurality of universal APIs for training the machine learning model using the selected machine learning algorithm, wherein the plurality of universal APIs provide standardized mechanisms for all of the machine learning algorithms registered in the machine learning algorithm repository.

5. The method of claim 4, wherein the plurality of universal APIs comprises at least one of:

a data collections API that provides computer logic for forming logical collections of data samples, associating features vectors with data samples and collections, and associating output labels generated by a trained machine learning model with data collections;

a training API that provides computer logic for training a machine learning model using the selected machine learning algorithm, describing the trained machine learning model generated by the training API, and associating the trained machine learning model with a data collection used to train the trained machine learning model, a prediction API that provides computer logic for classifying new data instances based on a previously trained machine learning model and for searching previously trained machine learning models, a cross-validation API that provides computer logic enabling selection of datasets for testing a trained machine learning model, or a clustering API that provides computer logic for performing a clustering of feature vectors based on a vector similarity measure.

6. The method of claim 1, wherein the machine learning algorithm metadata model comprises a description of aggregate data collections associated with the machine learning algorithm, a description of features generated by the machine learning algorithm from the data collections, a description of the machine learning model generated by the machine learning algorithm, and provenance information about the machine learning algorithm.

7. The method of claim 1, wherein the machine learning framework further operates to:

generate, in response to at least one matching trained machine learning model being identified in the search of the trained machine learning model index data storage, the analytics pipeline by integrating the at least one matching trained machine learning model into at least one stage of the analytics pipeline; and train, in response to the search of the machine learning algorithm index data storage identifying at least one matching machine learning algorithm, a machine learning model by executing the at least one matching machine learning algorithm, and integrate the trained machine learning model into a stage of the analytics pipeline.

8. A computer program product comprising a computer readable storage medium having a computer readable program stored therein, wherein the computer readable program, when executed on a computing device, causes the computing device to implement a machine learning framework which operates to:

register, in a machine learning algorithm repository, a plurality of machine learning algorithms, wherein each machine learning algorithm is an algorithm used to train a machine learning model to perform a related task;

index, by the machine learning framework, a plurality of machine learning algorithms to generate and store, in a machine learning algorithm index data storage, a machine learning algorithm metadata model for each machine learning algorithm in the plurality of machine learning algorithms;

receive, via a user interface of the machine learning framework, a user specification of at least one analytics pipeline task for which at least one machine learning model is to be trained;

convert, by a machine learning algorithm search criteria generation engine of the machine learning framework, the user specification to one or more machine learning algorithm search criteria;

search, by the machine learning framework, a trained machine learning model index data storage indexing a plurality of trained machine learning models to identify zero or more matching trained machine learning models having a corresponding trained machine learning model metadata model that matches the one or more machine learning algorithm search criteria;

output, via the user interface, information describing the zero or more matching trained machine learning model; and in response to the search of the trained machine learning model index data storage resulting in zero matching trained machine learning models being identified:

search, by a machine learning algorithm search engine of the machine learning framework, the machine learning algorithm index data storage, based on the one or more machine learning algorithm search criteria, to identify at least one matching machine learning algorithm having a corresponding machine learning algorithm metadata model that matches the one or more machine learning algorithm search criteria; and output, via the user interface, information describing the at least one matching machine learning algorithm, wherein the machine learning framework further operates to:

receive a user selection of a machine learning algorithm from the at least one matching machine learning algorithm; and train a machine learning model using the selected machine learning algorithm to generate a new trained machine learning model, and wherein training the machine learning model using the selected machine learning algorithm comprises invoking a plurality of universal application programming interfaces (APIs) to perform the training of the machine learning model.

9. The computer program product of claim 8, wherein the machine learning framework is further configured to:

register, in a trained machine learning model repository, the plurality of trained machine learning models; and index, by the machine learning framework, the plurality of trained machine learning models to generate and store in the trained machine learning model index data storage, a trained machine learning model metadata models for each trained machine learning algorithm in the plurality of trained machine learning models.

10. The computer program product of claim 8, wherein the machine learning framework further operates to determine, for each machine learning algorithm in the plurality of machine learning algorithms in the machine learning algorithm repository, a degree of matching of the machine learning algorithm to the one or more machine learning algorithm search criteria, wherein the output of the information describing the at least one matching machine learning algorithm comprises a ranked listing of the at least one matching machine learning algorithm based on the degree of matching for each matching machine learning algorithm in the at least one matching machine learning algorithm.

11. The computer program product of claim 8, wherein the machine learning framework comprises the plurality of universal APIs for training the machine learning model using the selected machine learning algorithm, wherein the plurality of universal APIs provide standardized mechanisms for all of the machine learning algorithms registered in the machine learning algorithm repository.

12. The computer program product of claim 11, wherein the plurality of universal APIs comprises at least one of:

a data collections API that provides computer logic for forming logical collections of data samples, associating features vectors with data samples and collections, and associating output labels generated by a trained machine learning model with data collections;

a training API that provides computer logic for training a machine learning model using the selected machine learning algorithm, describing the trained machine learning model generated by the training API, and associating the trained machine learning model with a data collection used to train the trained machine learning model, a prediction API that provides computer logic for classifying new data instances based on a previously trained machine learning model and for searching previously trained machine learning models, a cross-validation API that provides computer logic enabling selection of datasets for testing a trained machine learning model, or a clustering API that provides computer logic for performing a clustering of feature vectors based on a vector similarity measure.

13. The computer program product of claim 8, wherein the machine learning algorithm metadata model comprises a description of aggregate data collections associated with the machine learning algorithm, a description of features generated by the machine learning algorithm from the data collections, a description of the machine learning model generated by the machine learning algorithm, and provenance information about the machine learning algorithm.

14. The computer program product of claim 8, wherein the machine learning framework is further configured to:

generate, in response to at least one matching trained machine learning model being identified in the search of the trained machine learning model index data storage, the analytics pipeline by integrating the at least one matching trained machine learning model into at least one stage of the analytics pipeline; and train, in response to the search of the machine learning algorithm index data storage identifying at least one matching machine learning algorithm, a machine learning model by executing the at least one matching machine learning algorithm, and integrate the trained machine learning model into a stage of the analytics pipeline.

15. An apparatus comprising:

a processor; and a memory coupled to the processor, wherein the memory comprises instructions which, when executed by the processor, cause the processor to implement a machine learning framework which operates to:

register, in a machine learning algorithm repository, a plurality of machine learning algorithms, wherein each machine learning algorithm is an algorithm used to train a machine learning model to perform a related task;

index, by the machine learning framework, the plurality of machine learning algorithms to generate and store, in a machine learning algorithm index data storage, a machine learning algorithm metadata model for each machine learning algorithm in the plurality of machine learning algorithms;

receive, via a user interface of the machine learning framework, a user specification of at least one analytics pipeline task for which at least one machine learning model is to be trained;

convert, by a machine learning algorithm search criteria generation engine of the machine learning framework, the user specification to one or more machine learning algorithm search criteria;

search, by the machine learning framework, a trained machine learning model index data storage indexing a plurality of trained machine learning models to identify zero or more matching trained machine learning models having a corresponding trained machine learning model metadata model that matches the one or more machine learning algorithm search criteria;

output, via the user interface, information describing the zero or more matching trained machine learning model; and in response to the search of the trained machine learning model index data storage resulting in zero matching trained machine learning models being identified:

search, by a machine learning algorithm search engine of the machine learning framework, the machine learning algorithm index data storage, based on the one or more machine learning algorithm search criteria, to identify at least one matching machine learning algorithm having a corresponding machine learning algorithm metadata model that matches the one or more machine learning algorithm search criteria; and output, via the user interface, information describing the at least one matching machine learning algorithm, wherein the machine learning framework further operate to:

receive a user selection of a machine learning algorithm from the at least one matching machine learning algorithm; and train a machine learning model using the selected machine learning algorithm to generate a new trained machine learning model, and wherein training the machine learning model using the selected machine learning algorithm comprises invoking a plurality of universal application programming interfaces (APIs) to perform the training of the machine learning model.

16. The apparatus of claim 15, wherein the machine learning framework is further configured to:

register, in a trained machine learning model repository, the plurality of trained machine learning models; and index, by the machine learning framework, the plurality of trained machine learning models to generate and store in a trained machine learning model index data storage, a trained machine learning model metadata model for each trained machine learning algorithm in the plurality of trained machine learning models.

17. The apparatus of claim 15, wherein the machine learning framework comprises the plurality of universal APIs for training the machine learning model using the selected machine learning algorithm, wherein the plurality of universal APIs provide standardized mechanisms for all of the machine learning algorithms registered in the machine learning algorithm repository.

* * * * *